Sept. 3, 1940.  O. F. REITER  2,213,370
STONE PICKING MACHINE
Original Filed Oct. 23, 1937  5 Sheets-Sheet 1
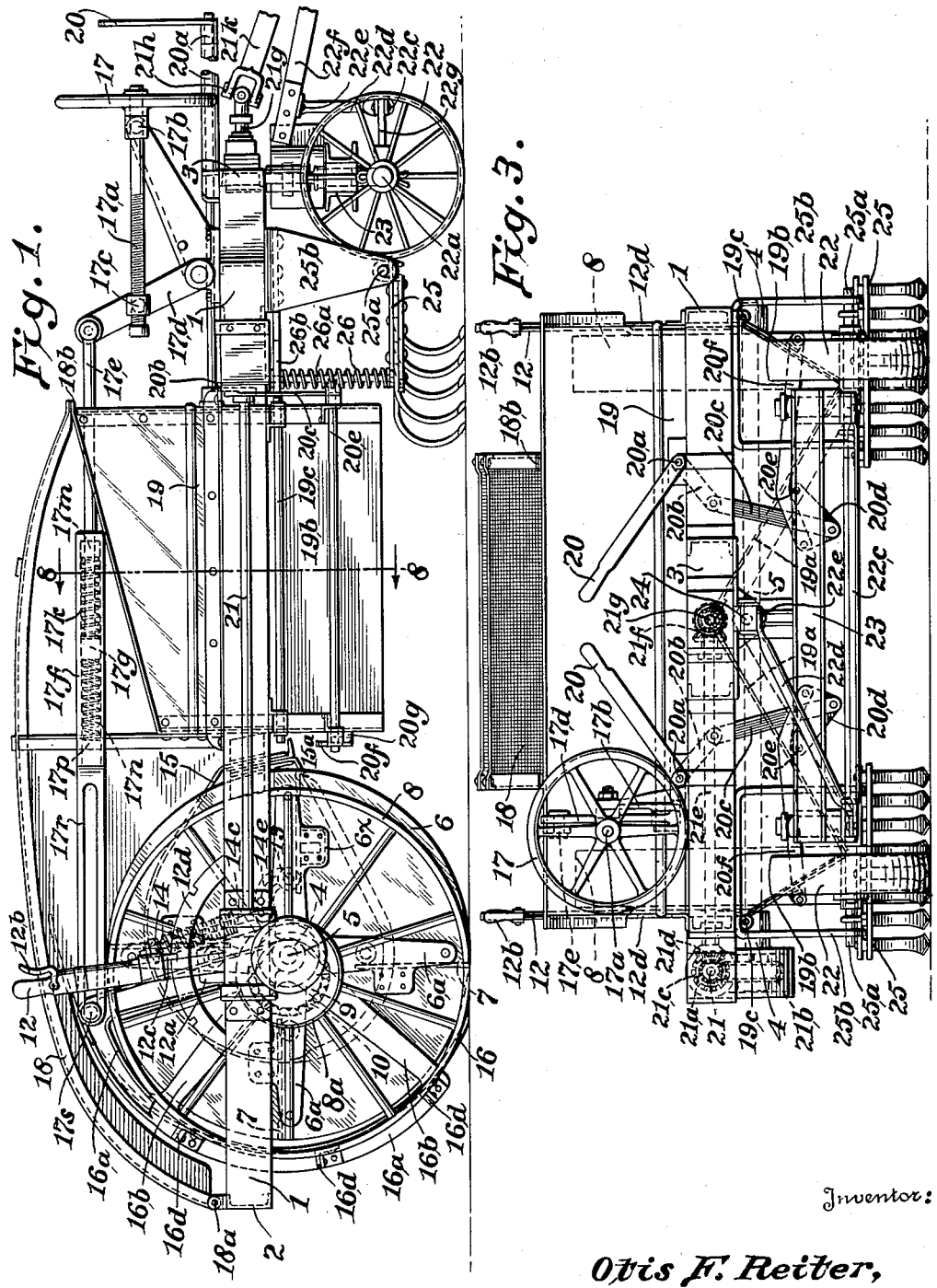
Inventor:
Otis F. Reiter,
By Spear, Donaldson & Hall
Attorneys.

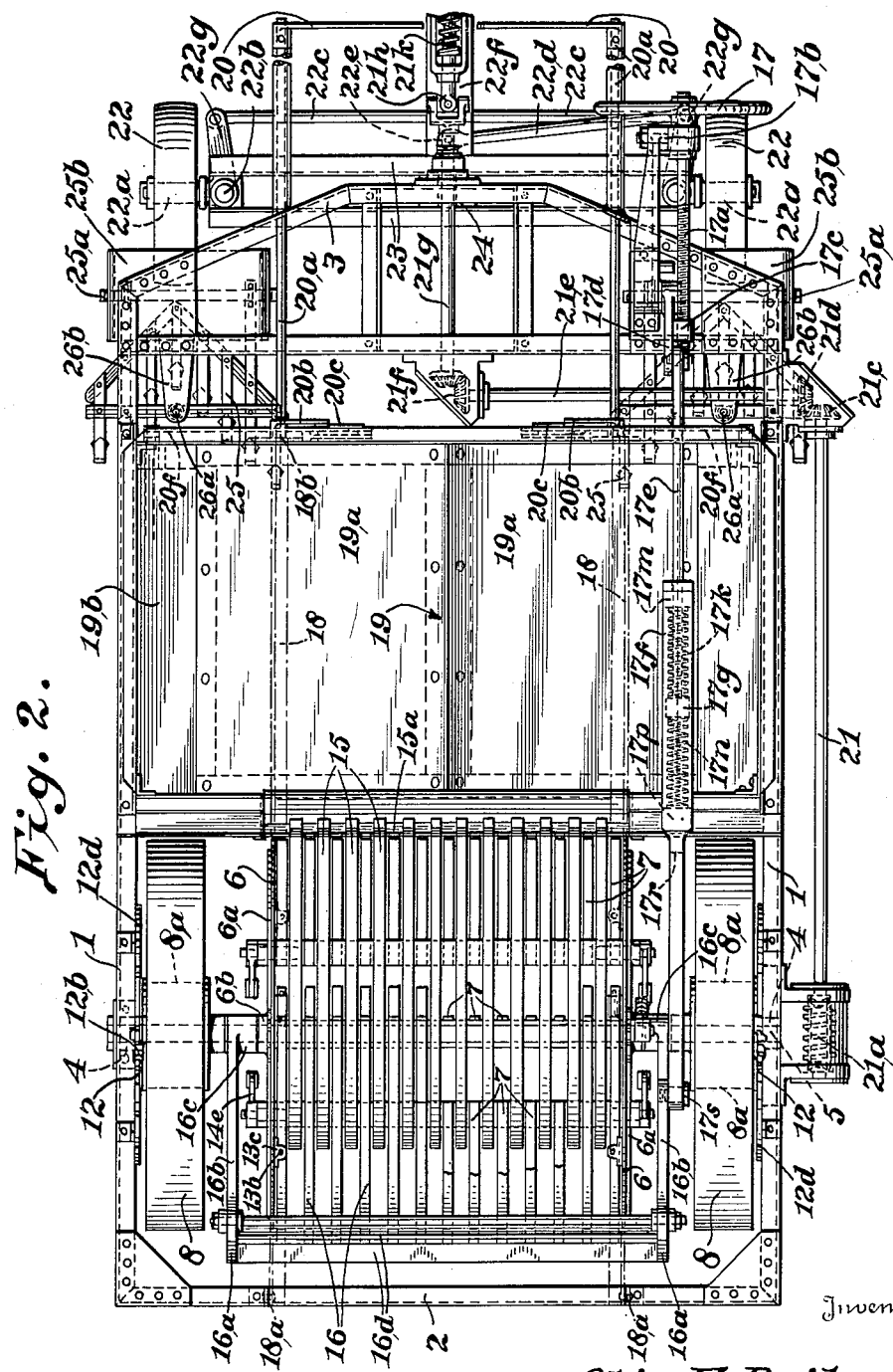

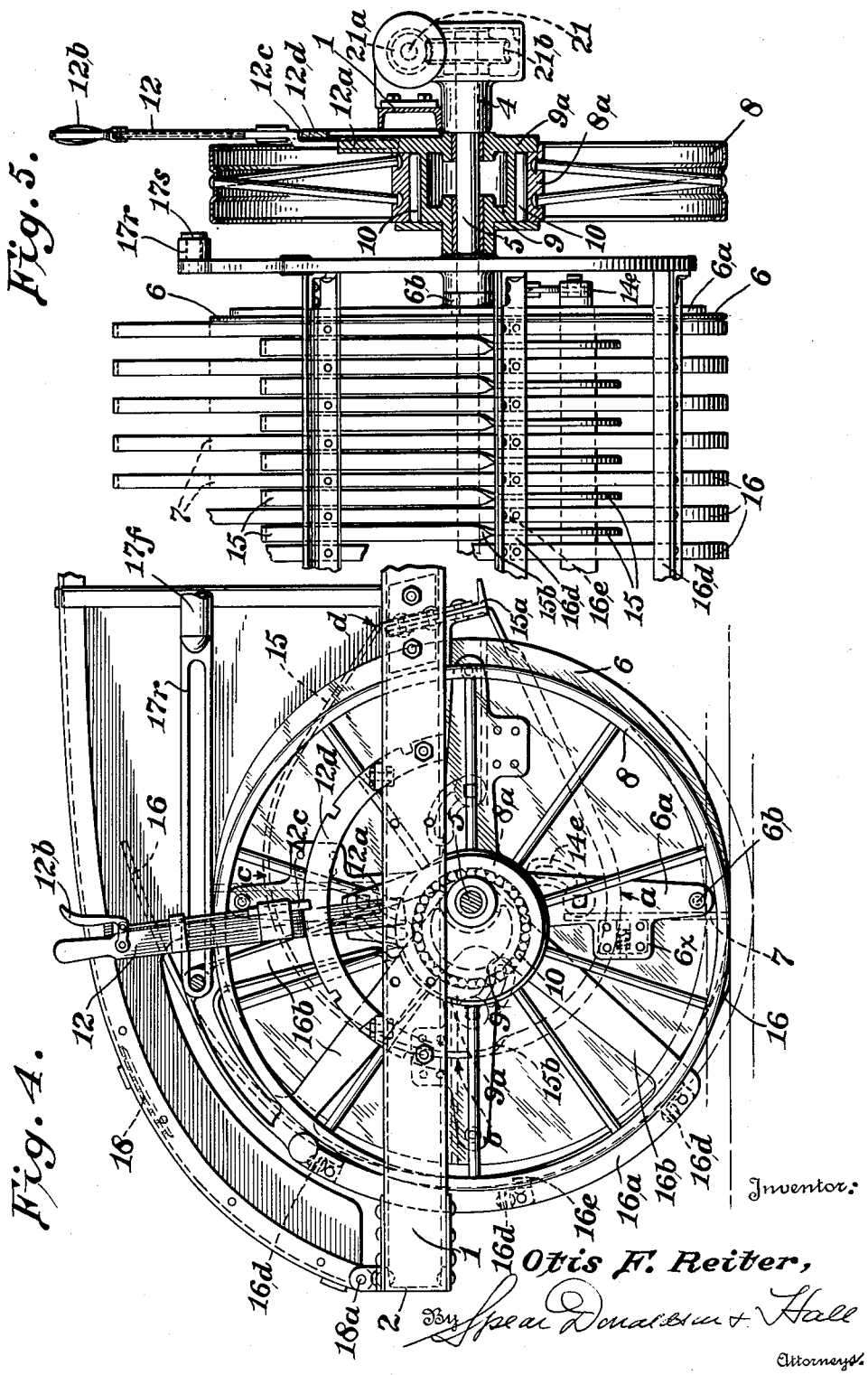

Sept. 3, 1940.   O. F. REITER   2,213,370
STONE PICKING MACHINE
Original Filed Oct. 23, 1937   5 Sheets-Sheet 4

Inventor:
Otis F. Reiter,
By Spear, Donaldson & Hall
Attorneys.

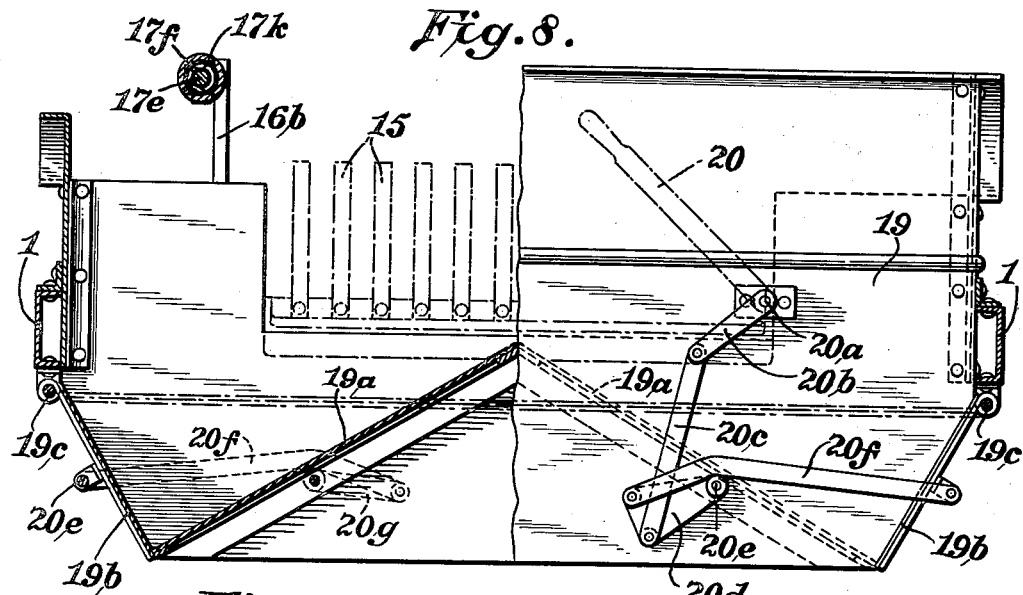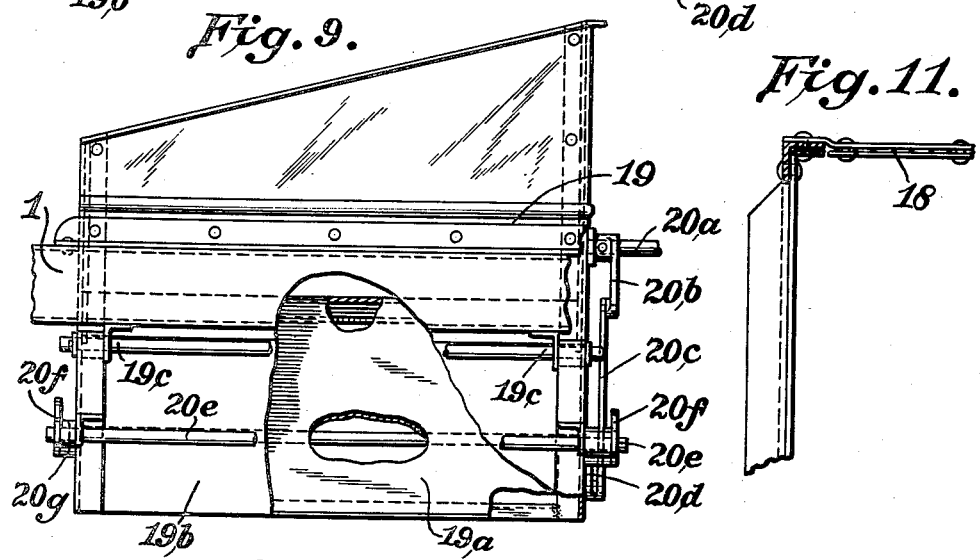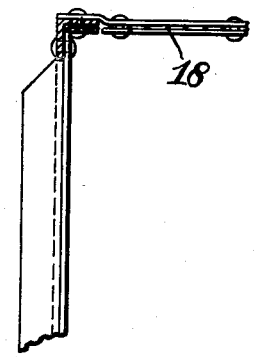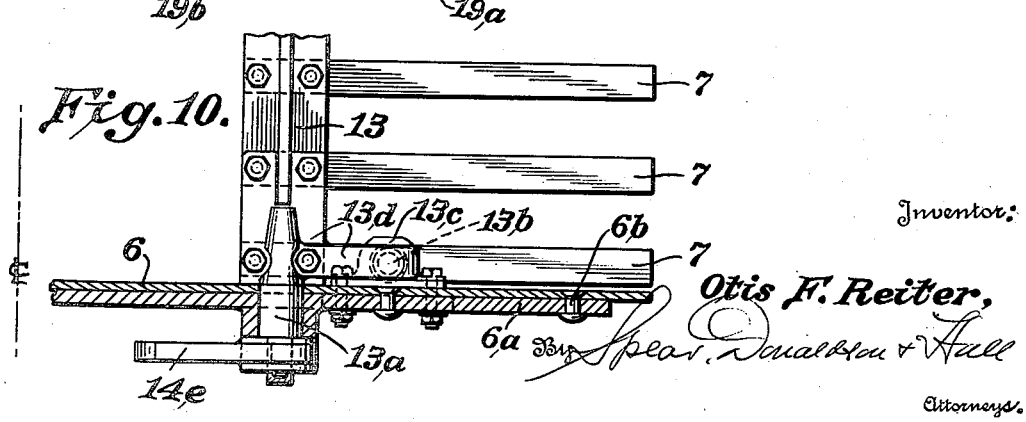

Patented Sept. 3, 1940

2,213,370

UNITED STATES PATENT OFFICE 2,213,370

STONE PICKING MACHINE

Otis F. Reiter, Baltimore, Md., assignor to Fastpic Corporation, Baltimore, Md., a corporation of Maryland Application October 23, 1937, Serial No. 170,674
Renewed February 1, 1940

16 Claims. (Cl. 55—17)

The invention concerns apparatus for picking stones from a field, roadway, or other areas, and delivering them to a certain point for their disposition.

The invention consists in the features and arrangement and combination of parts as will be hereinafter described and particularly pointed out in the claims.

In the drawings

Figure 1 is a side elevation of the apparatus embodying my invention.

Fig. 2 is a plan view of Figure 1.

Fig. 3 is a front elevation looking from the right of Fig. 1.

Fig. 4 is a view of the rear carrying wheel in elevation, together with the rear rake teeth, the adjustable frame therefor, and elements associated with the reel which picks up and transports the stone.

Fig. 5 is a cross sectional view along the shaft of the rear carrying wheels with parts in elevation, this view being of a fragmentary character.

Fig. 8 is a part front elevation and a part transverse sectional view on the line 8—8 of Figure 1 of a hopper organization.

Fig. 9 is a side elevation of the hopper organization shown in Figure 1, detached and enlarged.

Fig. 10 is a detailed plan view of a portion of the reel, its pick-up arms, their mounting, and a shock absorber.

Fig. 11 is a detail view relating to a guard screen.

Figure 6:
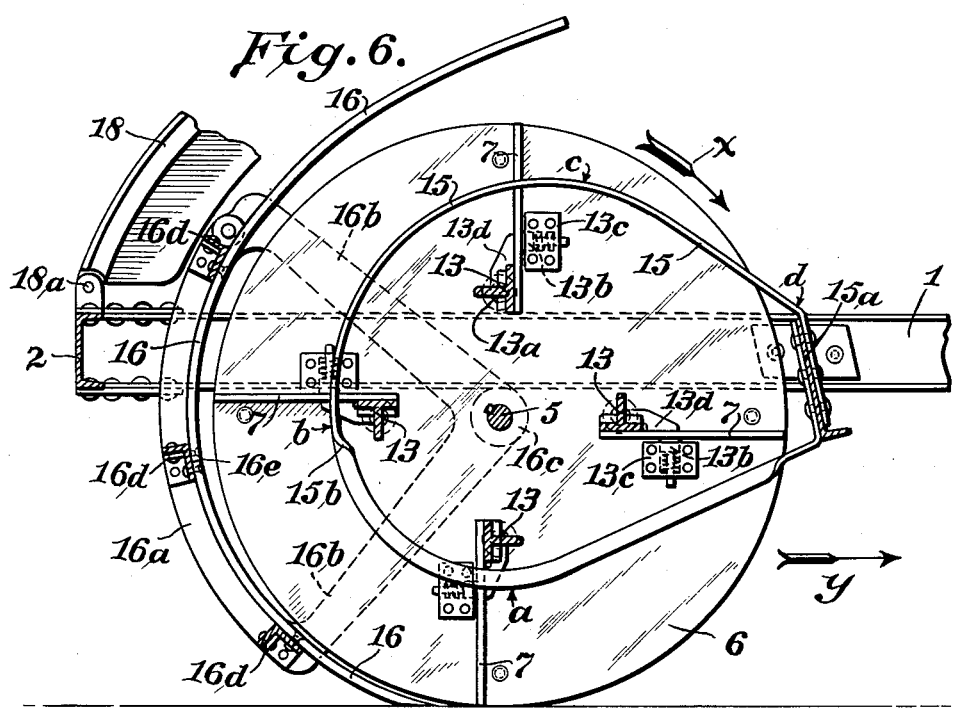
Fig. 6 is a view of the reel for picking up the stones and transporting them to a place of delivery, together with parts associated with said reel, including rear rake teeth, and means for mounting the same, certain elements being shown in section. This view shows the disc on the far side of the reel, and also the stone directing bar located within the reel.
Figure 7:
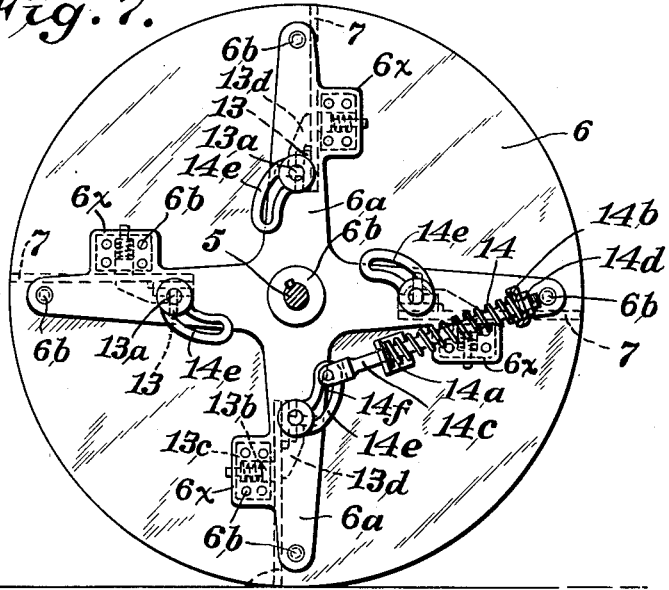
Fig. 7 is an outside elevation of the reel.

The frame of the machine includes side bars 1, a rear cross bar 2, and a front cross bar 3, all of which may be made of angle iron. On the under side of the frame's side bars, bearings 4 are fixed for a transverse shaft 5. On this shaft are fixedly mounted side discs 6 forming part of a reel which carries arms 7 for picking up stones from the field, or other area being traversed by the apparatus.

The frame is supported at its rear portion by carrying wheels 8, one at each side of the apparatus. These carrying wheels are mounted on bearings 9 of cylindrical or circular form, with ball bearings 10 interposed between the said cylindrical bearings 9 and hub 8a of the carrying wheels. The circular bearing members 9 are eccentrically mounted on the shaft 5 to be adjustable about the same for raising and lowering the rear end of the frame 1 relative to the ground, by changing the relation of the eccentric about the shaft 5, which it supports. For making this adjustment, a hand lever 12 is provided, one at each side of the apparatus, which is connected at its lower end with an arm 12a forming an upward extension of the flange 9a of the eccentric 9. The hand lever is equipped with a finger lever 12b controlling a pawl 12c engageable with notches of a quadrant 12d fixed to the frame. By operating these hand levers, the eccentrics, one for each carrying wheel, may be turned about the axis of the carrying wheels and within the hubs thereof so as to raise or lower the shaft 5 relative to the ground, the carrying wheels, of course, maintaining contact with the ground at all adjustments.

In other words, by using this adjusting mechanism, there is a relative adjustment effected between the carrying wheels and the shaft 5 which supports the reel or drum, which latter carries, as before stated, the lifter arms or tines 7 for lifting the stones from the ground for their delivery to a suitable point, as will be presently described.

Reel construction.—The reel for picking the stones and elevating them to a point of delivery comprises the discs 6, one at each side of the machine.

Each disc is reinforced by a frame member or spider composed of arms 6a radiating from a hub 6b fixedly mounted on the shaft 5 to rotate therewith. The reinforcing spider is secured to the side discs 6 in any suitable manner, as by rivets or bolts, for instance, at points 6b. By the use of this spider or reinforcing frame, the discs may be relatively thin because they have little work to do, and are mainly to serve as guards against stones flying laterally out of the apparatus. The spiders or reinforcing frames 6a, however, are heavy enough to afford support for rock shafts 13 mounted therein, said shafts extending from disc to disc and having their journals 13a mounted in bearings or bosses on the spider arms 6a. The rock shafts may be of any suitable form. I have shown them of angle iron form. They carry fixed thereto in any suitable way tines or lifter arms 7, which are spaced apart along the shaft from end to end thereof and extend in a direction substantially radially of the drum or reel, of which they form a part, and to a point the same distance from the shaft 5 as is the edge of the discs or side plates 6. These tines or stone lifting arms travel revolubly about the axis of the reel in the direction of the arrow $x$ in Fig. 6 when the apparatus is moving forward in the direction of the arrow $y$.

They are yieldingly mounted because their rock shafts 13 are subjected to the action of springs 14 supported on the outer sides of the reel or drum 6—6a. These are compression springs in the sense that when one of the tines or pick-up arms 7 meets resistance from a stone too large for it to pick up, the said arm will yield because the compression of the spring will allow this yielding action to take place.

The spring 14 at its inner end bears upon a projection or bracket 14a fixed to the disc 6 or to the spider, and at its outer end said spring is borne upon by a cup shaped plate 14b held by a nut 14d on a rod 14c passing axially through the spring 14 and slidably through the bracket 14a, with its inner end connected to a lever arm 14e which is fixed on the outer end of the journal of the shaft 13 carrying a whole row of said tines or arms. The connection between the rod 14c and the lever arm 14e is by a pin on the rod and a curved slot 14f in the arm. There is one of these lever arms and one of these compression springs at each end of the shaft 13 located outside the reel or drum. When any one of the tines meets undue resistance by engaging a stone that it cannot lift, the rock shaft 13 to which said tine is connected, forming one of a set so connected, will swing rearward relative to its direction of revoluble travel, and this stress will be communicated through the slotted lever arm 14e, rod 14a, to the spring 14, which will yield compressively instead of expansively, and thus the tine will be enabled to yield sufficiently to pass over the obstruction. When the obstruction is passed, the expansive force of the spring will return the parts to normal position, said returning movement being cushioned by a shock absorber consisting of a spring pressed plunger 13b mounted in a bracket 13c located on the inner side of the side disc against which plunger the end one of the series of tines strikes on the restoring movement of the shaft.

In order to reinforce the tine that enters into this shock absorbing action, it is backed up by an arm 13d affixed to or forming part of the structure of the rock shaft. This reinforcing arm prevents the tine from breaking off under the more or less violent restoring action of the rock shaft under pressure of the spring 14.

While the bracket or casing 13c which houses the shock absorbing plunger 13b is on the inner side of the disc 6 of the reel, it is supported mainly by the spider 6a for which purpose the latter has a lug 6x formed integrally therewith and rivets connect the casing or bracket 13c therewith, said rivets passing through the side plate 6 of the reel. The spider is therefore utilized as the main support for the rock shafts 13a carrying the stone lifting arms, and for the shock absorber plunger and casing. These spiders are of sufficient strength to resist the stresses to which the stone lifting parts and the shock absorber are subjected, and take these stresses off from the side discs 6 of the reel, which may be of comparatively light construction.

*Conveyor bars.*—I provide bars 15 for conveying or directing the stones lifted and propelled by the tines or arms 7 to a point of delivery in front of the reel 6—6a, at which point there may be a hopper for receiving the stones, or any suitable appliance for collecting them and conveying them away.

These directing bars are arranged in a series between the sides 6 of the reel, but they are secured to a frame bar 15a extending from one side bar 1 to the other, and secured thereto.

The directing bars are in the form of a loop curving rearwardly and upwardly to a level $b$ from a low point level $a$, and then forwardly and upwardly to a level $c$, and thence downwardly to a level $d$, where the stones leave them and are deposited in a hopper, or other receiving means above mentioned. The stones are propelled along the course $a$, $b$, $c$, $d$, mentioned, by the lifting arms or tines 7 which project through the spaces between the directing or conveyor bars 15. These directing bars are secured to the frame only at the forward portions of their loop formation, i. e., at 15a, as above mentioned. They are formed of flat metal strips. Their lower portions are set up edgewise vertically. They are twisted at 15b and their upper portions lay horizontally flatwise, so that their upper surfaces are presented in proper position to receive the stones thereon.

The propelling arms or tines project between these directing bars and push the stones along until they reach to or near to the front ends of the downwardly inclined portions of the bars near their discharge points.

The lower stretches of these loops or bars being set up vertically on edge provide wide spaces between them for the passage of dirt or material that should be restored to the ground. The looped directing bars being supported only at their forward ends, can flex laterally to accommodate any irregularity in the relation between the tines and bars.

At the rear of the path of movement of the stone lifting arms, a rake is located consisting or curved metal bars or tines 16 carried by a frame 16a pivotally mounted on the shaft 5 to be adjusted about said shaft, as a pivot, in relation to the ground. The frame 16a is made up of side members, each comprising arms 16b radiating from a hub portion 16c, and connected together by cross bars 16d of angle iron riveted to the arc-shaped portion 16a of the side frames. The rake teeth are riveted to the angle iron cross bars. These rake teeth may be made in sections joined at 16e. The lower sections may be made of higher grade metal than the upper sections, the latter having little work to do except to act as guards to prevent the flying out of the stones from the space between said rake teeth extensions and the directing bars 15 along which space the stones are propelled by the arms 7. The upper sections extend forwardly above the reel and are free from support at their forward ends.

In addition to the shielding effect of the upper portions of the rake teeth acting to prevent the flying out of stones from the apparatus, I may provide additional guard means consisting of a screen 18. This may be of any suitable form pivotally mounted at 18a on the main frame, and extending over the reel, and the hopper in front of the reel, so that any flying stones will be caught and kept within the limits of the apparatus itself.

The rake carrying frame is adjusted to raise or lower the rake teeth relative to the surface of the ground being traversed by a handwheel 17 at the front of the machine convenient to the driver's seat. This handwheel operates a screw shaft 17a mounted in a bracket 17b and passing through a nut 17c carried by a pivoted arm 17d mounted on the main frame. The upper end of this pivoted arm is connected by a rod 17e to a link member 17f, for which purpose the rod passes into a hollow portion of said link member and is provided with a head 17g located at a point spaced apart from the end of the link, with a spiral spring 17k interposed between the head and the end 17m of said link.

There is also a spring 17n between the head 17g and the shoulder or bearing 17p of the link. The link has a slot 17r which receives a pin 17s of one of the side frames 16a of the rake carrying means.

By the connections described, the rake teeth may be raised or lowered in relation to the ground line. As before stated, the whole rear portion of the frame may be raised or lowered in relation to the carrying wheels by operating the eccentric 9 by the hand levers 12, and, of course, the reel or drum carrying the rotary propeller arms 7 for the stones will follow the adjustment up or down of the rear portion of the main frame relative to the carrying wheels, and hence in relation to the ground line.

By this means the parts may be properly adjusted for cooperation in the working of the apparatus, or by lifting the rear portion of the frame relative to the carrying wheels, the reel or the drum, and also the rake organization, may be lifted relative to the ground line for transrtation of the apparatus from place to place without the necessity of the apparatus performing its functions in lifting and transporting the stones.

In front of the point of delivery d, shown in Fig. 6, where the stones leave the directing or conveyor bars 15, I arrange a hopper, shown generally at 19, to receive the stones, so that they may be collected for delivery as may be desired. This hopper has its bottom portion made up of two inclined members 19a diverging downwardly and laterally of the apparatus from the center line thereof running longitudinally. The hopper is provided with side doors, one at each side of the apparatus 19b, said doors being hinged at 19c to the framework, so that by operating the hand levers 20, the doors, or either one of them, as may be desired, may be opened for delivering the collected stones off to one side of the machine, said stones sliding down the inclined bottoms 19a in a direction laterally of the machine.

The hand levers 20 are pivoted at 20a to the frame of the machine and are in the form of bell cranks, the shorter arms of which 20b are connected by links 20c with a swingable member 20d pivoted to the frame at 20e. These swingable members are connected by links 20f to the doors 19b. The hand levers 20, together with the lever and link connections to the doors, as just described, may be located at one end of the hopper organization, whereas at the other end a set of the connections for controlling the hopper doors would consist only of a link corresponding to 20f, as shown in dotted lines of Fig. 8, and a link 20g, also shown in dotted lines in Fig. 8.

It will be understood that the pivots 20a are in the form of rock shafts, and these extend close to a point at the forward part of the apparatus close to the location of the seat on the tractor, which is employed for giving motive power to the apparatus. Likewise the pivots 20e are in the form of rock shafts, as shown in Fig. 9, connecting the linkage at the front end of the hopper organization with the linkage at the rear end of the hopper, so that the linkage at both ends of the hopper for operating the doors may be operated from only one set of hand levers 20 connected with the forward ends of the rock shafts 20a. The shaft 5 is rotated to turn the stone pick-up reel or drum affixed thereto by the following mechanism:

There is a shaft 21 extending along one side of the apparatus having on its rear end a worm 21a meshing with the worm gear 21b on the shaft 5. The shaft 21 at its forward end has a beveled gear 21c meshing with a beveled gear 21d on a transverse shaft 21e suitably journaled in the frame and connected through beveled gears 21f with a shaft 21g, which is coupled by universal joints 21h with a drive shaft 21k connected with the tractor organization, so that the stone picking-up reel may be operated from the tractor which draws the apparatus over the field or other area being treated. The front carrying wheels 22 are mounted on stud shafts 22a, pivoted at 22b, operated by a link 22c so as to be adjusted in unison. A link 22d pivotally connected at 22e with the tongue 22f of the apparatus operates on the arms 22g, so that the front carrying wheels 22 are controlled as to their positions in unison by the lateral swinging of the draft tongue 22f. The stub axles 22a are mounted by the pivots 22b, before mentioned upon an axle frame 23 which is pivotally mounted at 24 to have swinging movement in a vertical plane extending transversely of the apparatus, so that the carrying wheels 22 can rise and fall to accommodate variations in the ground surface. In the rear of the front carrying wheels 22, is a rake 25 made up of a number of tines in rows, said rows of tines or rake teeth being connected together and pivoted at 25a to a bracket 25b depending from the forward portion of the framework. This rake organization may swing up and down, its function being to clear stones from the path of the rear wheels, so that the rear carrying wheels 8 will have a comparatively smooth surface to traverse, it being more important that a smooth track be provided for the rear carrying wheels, because up and down movement of said carrying wheels is not desirable owing to their intimate association with the stone pick-up reel and the rear rake organization. For pressing the front rake 25 down upon the surface of the ground, a spring 26 is employed having a rod 26a which is connected with the rake organization at its lower end and extends up through an opening in the rearwardly extending arm 26b connected with the bracket 25b. This spring provides a cushion for controlling the action of the front rake organization.

Variations in the surface of the ground traversed by the front carrying wheels will not affect in any substantial measure the action of the apparatus because these wheels will accommodate themselves to such surface variations by reason of the fact that the frame 23 carrying these wheels is pivoted at 24 as above described.

Reverting to the arrangement of parts for preventing stones from flying away from the machine, the screen extends from its pivot 18a to the front upper edge of the hopper at 18b, Fig. 1, so as to cover the entire upper open top of the hopper and to direct the stones thereinto. The plane of this top opening of the hopper is inclined downwardly and rearwardly, so that there will be free access of the forwardly flying stones to the hopper.

The high front wall of the hopper acts as a guard to catch the stones. For this general purpose, the upper edges of the hopper sides incline from a comparatively low point at the rear upwardly and forwardly to the upper edge of the upwardly extended front wall of the hopper. The screen has sides which prevent the stones from flying out laterally from the machine.

By moving the screen about its rear pivot, access may be had to the working parts of the apparatus.

I claim:

1. In a stone picking machine, a frame, carrying wheels, a reel having arms for picking up stones arranged between the carrying wheels, a rotary shaft on which said reel is fixedly mounted, power drive means for said shaft, bearings on the frame in which said shaft is mounted, bearings for the carrying wheels supported by the shaft in eccentric relation thereto, and means for adjusting said bearings to change the height of the frame and the reel relative to the carrying wheels and ground, substantially as described.

2. Apparatus according to claim 1 in which a rake is located in rear of the reel to dislodge the stones from the ground, means for carrying said rake pivotally mounted on the rotary shaft, and means to adjust the rake carrying means about the shaft for adjusting the rake relative to the ground line, substantially as described.

3. In combination in a stone picking machine, a main frame, a rotary shaft mounted on said frame, a reel having arms for picking up stones from the ground, and fixedly mounted on said shaft, power drive connections extending from the front of the machine to said shaft for rotating it, carrying wheels, one at each side of the frame, and between which the reel is located, a rake at the rear of said reel for dislodging the stones from the ground to be taken by said reel arms, and means for adjusting the main frame with its reel relative to the carrying wheels, said means including bearings for the wheels and adjusting means for said bearings, substantially as described.

4. In combination, a main frame, carrying wheels therefor, means for adjusting the frame relative to and associated with the said wheels, a reel carrying arms to pick up stones, a shaft journaled in the main frame and carrying said reel fixed thereto to rotate therewith, means for driving said reel from a power unit connected with the machine, said reel being located between said carrying wheels, a rake in rear of the reel and carrying means therefor mounted on and adjustable about said shaft, substantially as described.

5. Apparatus according to claim 4 in which the means for adjusting the frame relative to the carrying wheels consists of circular bearings for said wheels mounted loosely and eccentrically on the shaft, a lever connected with each bearing to turn the same about the shaft, and means for holding the levers in adjusted position, substantially as described.

6. In apparatus of the class described, a main frame, front carrying wheels, rear carrying wheels, a reel between the rear carrying wheels having arms for picking up stones, a shaft mounted in the frame and on which the reel is fixedly mounted, power driven connections for rotating said shaft, and adjustable means mounted on the shaft and mounting the carrying wheels, substantially as described.

7. In combination in apparatus of the class described, a main frame, a shaft mounted in bearings on said frame, power drive mechanism for rotating the shaft, carrying wheels, bearings on which carrying wheels turn eccentrically mounted on the shaft, means for adjusting the said bearings to raise or lower the main frame together with the shaft mounted therein, a reel having arms, affixed to the shaft to rotate therewith and to be adjusted with said main frame relative to the carrying wheels, and a rake in rear of the reel mounted to turn about said shaft, to be adjusted relative to the ground, means for adjusting said rake, said rake also partaking of the adjustment of the main frame relative to the ground line, substantially as described.

8. In apparatus of the class described, a reel comprising spaced apart side discs, rock shafts mounted in the reel, stone lifting arms mounted on the rock shafts for picking up stones, arms connected with the rock shafts, rods connected with said arms, springs on the rods, said springs at one end bearing on the reel, and means on the rods bearing on the other ends of the springs to compress said springs when the stone lifting arms yield on meeting an obstruction, said arms and said rods with their springs being mounted on the outer sides of the said side discs, substantially as described.

9. In apparatus of the class described, a reel comprising side discs, reinforcing spider members connected to said discs externally thereof, rock shafts mounted in said reinforcing members, stone lifting arms mounted on said rock shafts, springs connected with the rock shafts for holding them, together with their stone lifting arms, yieldingly in operating position, shock absorbing means to cushion the restoring movement of the rock shafts when their arms pass an obstruction, said shock absorbing means being located on the inner side of the discs and connected with and supported by said external reinforcing means or spiders, substantially as described.

10. In apparatus of the class described, a rotary reel having arms for picking up the stones and delivering them forwardly in relation to the reel, conveyor bars spaced apart for the movement of said arms between them and substantially surrounding the axis of the reel, rake teeth in rear of the reel for dislodging stones from the ground to be lifted by said arms, said rake teeth having upward extensions reaching forwardly over the reel and over said conveyor bars to guard against flying of the stones propelled by said reel, said conveyor bars being supported at their front ends but otherwise being free from support, and the rake teeth extensions being free from support at their forward ends, substantially as described.

11. Apparatus of the class described having a reel with arms for picking up and propelling stones and the like, and a screen extending over the reel to prevent stones from flying away from their prescribed course, said screen being pivotally mounted on the frame at its rear end.

12. In apparatus of the class described, a main frame, a rotary reel mounted therein for picking up stones, a rake in rear of the reel pivotally mounted, a manually operable member, and a connection leading therefrom to the rake for raising and lowering the rake, said connection comprising a rod having a head thereon, a hollow link in which said head is located with cushion springs in the hollow link, one on each side of the said head, and between it and shoulders on the link, substantially as described.

13. In apparatus according to claim 12 in which the link has a slot receiving a pin from the rake to allow upward movement of the rake independently of the movement of the link, substantially as described.

14. Apparatus for picking stones from the ground comprising a main frame, carrying wheels therefor, a reel rotatively mounted in the frame for picking up the stones and delivering them frowardly of the machine, and a hopper carried by the frame at the front side of the reel, said hopper having side doors, and a bottom diverging downwardly and laterally of the frame to discharge the stones collected from the reel off to the sides of the machine, substantially as described.

15. Apparatus according to claim 14 in which the doors of the hopper are operated by hand levers with link connections at the front of the hopper connected with the doors, and link connections at the rear of the hopper also connected with the doors, and rock shafts connecting the front and rear sets of connections, substantially as described.

16. In combination, a main frame, carrying wheels therefor, a reel mounted therein to pick up stones and deliver them towards the front of the apparatus, a hopper in front of the reel, said hopper having a comparatively high front wall with sides the upper edges of which incline rearwardly and downwardly to provide a rearwardly and downwardly inclined top opening, and a screen extending over the reel and substantially to the upper edge of the front wall of the hopper to direct the stones into said hopper, substantially as described.

OTIS F. REITER.